United States Patent [19]

Salva

[11] Patent Number: 4,553,609

[45] Date of Patent: Nov. 19, 1985

[54] GANG PLOW OF VARIBLE WORKING WIDTH

[75] Inventor: Henri E. Salva, Croix, France

[73] Assignee: J. I. Case Company, Racine, Wis.

[21] Appl. No.: 517,549

[22] Filed: Jul. 27, 1983

[51] Int. Cl.⁴ .................... A01B 65/02; A01B 69/00
[52] U.S. Cl. .................................. 172/647; 172/287
[58] Field of Search ............... 172/221, 283, 287, 569, 172/576, 647

[56] References Cited

U.S. PATENT DOCUMENTS

| | | | |
|---|---|---|---|
| 1,635,019 | 7/1927 | Walton | 172/569 |
| 3,817,333 | 6/1974 | Kinzenbaw | 172/283 |
| 3,920,080 | 11/1975 | Vassiliou | 172/647 X |
| 4,186,806 | 2/1980 | Ward | 172/283 |

FOREIGN PATENT DOCUMENTS

| | | | |
|---|---|---|---|
| 2438959 | 5/1980 | France | 172/742 |
| 1459923 | 12/1976 | United Kingdom | 172/647 |

*Primary Examiner*—Richard T. Stouffer
*Attorney, Agent, or Firm*—Dressler, Goldsmith, Shore, Sutker & Milnamow, Ltd.

[57] ABSTRACT

An adjustable width plow having its diagonal frame pivoted to a forecarriage unit at a point such that pivotal adjustment of the frame relative to the forecarriage results in both a variation in the cutting width and a transverse displacement in the proper amount of the first plow bottom in the appropriate direction.

8 Claims, 3 Drawing Figures

GANG PLOW OF VARIBLE WORKING WIDTH

CROSS-REFERENCE TO RELATED APPLICATION

This application is a continuation of Application Ser. No. PCT/FR82/00203, filed Dec. 3, 1982 and assigned to the assignee hereof.

BACKGROUND OF THE INVENTION

1. Field of the Invention

This invention relates to gang plows whether of the rollover type or not and having a variable width, that is, plows in which the transverse spacing between furrow-cutting lines or so-called lines of action of two adjacent plow bottoms is adjustable in order to obtain a correspondingly variable furrow pitch.

Plows of this type are provided in known manner with a beam which is inclined with respect to the direction of forward travel of the tractor and which carries a plurality of plow bottoms maintained in uniformly spaced and parallel relation by means of a device of the deformable parallelogram type.

Adjustment of the furrow pitch is obtained on the one hand by modifying the common angular position of the plow bottoms with respect to the plow beam and on the other hand by modifying the angular position of the beam with respect to the tractor in order to ensure that the lines of action of the plow bottoms are aligned with respect to the direction of forward travel.

The plow beam is supported at the rear end by a wheel which bears on the ground and at the front end, through a forecarriage unit, by the link-arms of the tractor "three-point hitch" system. In the case of a rollover plow, the beam is capable of undergoing a pivotal displacement through an angle of 180° about a longitudinal axis with respect to the forecarriage unit.

The double problem encountered in gang plows lies in the fact that, on the one hand, the furrow-cutting lines or so-called lines of action of the plow bottoms must be parallel to the direction of forward travel while plowing is in progress and after or during adjustment of spacing of said lines of action and that, on the other hand, the line of action of the foremost plow bottom must be positioned relative to the tractor such that its furrow will be located with respect to the furrow cut during the previous trip at a distance equal to the new furrow spacing.

2. Description of the Prior Art

This problem can be solved by using two hydraulic cylinders for setting the cutting width and for transversely displacing the support beam of the plow bottoms as is shown in U.S. Pat. No. 4,186,806. This has proven to be a satisfactory solution, however, the two hydraulic cylinders along with the necessary conduits and controls add considerably to the cost of that system.

Another satisfactory solution, has been proposed by the Applicant in his pending U.S. patent application Ser. No. 290,903 filed Aug. 7, 1981, now U.S. Pat. No. 4,415,040, which application is by reference hereby made a part of this application.

SUMMARY OF THE INVENTION

The object of the present invention is to propose another solution to the above mentioned problem.

The gang plow according to the subject invention, is the type having, a plurality of plow bottoms mounted in uniformly spaced relation along a common support beam, plow bottom support brackets rigidly fixed to one bottom and pivoted to the plow beam about vertical axes, a coupling member pivotally attached to the plow bottom support brackets in order to define, with the beam, a device consisting of deformable parallelograms, and a frame or forecarriage unit mounted at the rear end of the tractor hitch. The invention is characterized in that the plow beam is pivoted to the forecarriage unit about a first vertical axis fixed relative to the forecarriage unit, control means being provided for varying the angle formed by the beam and the direction of forward travel of the tractor, the position of said first fixed vertical axis being arranged so that a tilting of the beam about said first fixed axis causes at the same time a variation of the cutting width and a transverse displacement of the same value to the first plow bottom in the appropriate direction.

According to a preferred embodiment, one of the plow bottom supports is coupled to the forecarriage so that a spindle carried by the plow bottom support pivots about a second vertical axis fixed relative to said forecarriage, said first and second fixed axes, said spindle of said plow bottom support and the articulation axis of said plow bottom support on the beam forming a deformable parallelogram contributing to maintaining alignment of the plow bottoms with the forward travel of the tractor.

The control means are preferably a double-acting hydraulic cylinder arranged and acting between the forecarriage and the beam.

According to the illustrated embodiment, said first fixed vertical axis is situated in front of the first plow bottom, in alignment with the articulations or pivot-pins of the plow bottom supports on the beam and at a distance from the pivot pin of the first plow bottom support equal to the distance between the pivot-pins of two successive plow bottom supports on the plow beam.

The plow beam and the first plow bottom support are guided with respect to the forecarriage via systems of curved slots which are respectively centered on said first and second axes.

The invention will become more apparent from the reading of the following description, with reference to the appended drawings in which:

BRIEF DESCRIPTION OF THE DRAWINGS

FIG. 3 is a sectional view developed along the curved line III—III of FIG. 1.

DESCRIPTION OF THE PREFERRED EMBODIMENT

Figure 1:
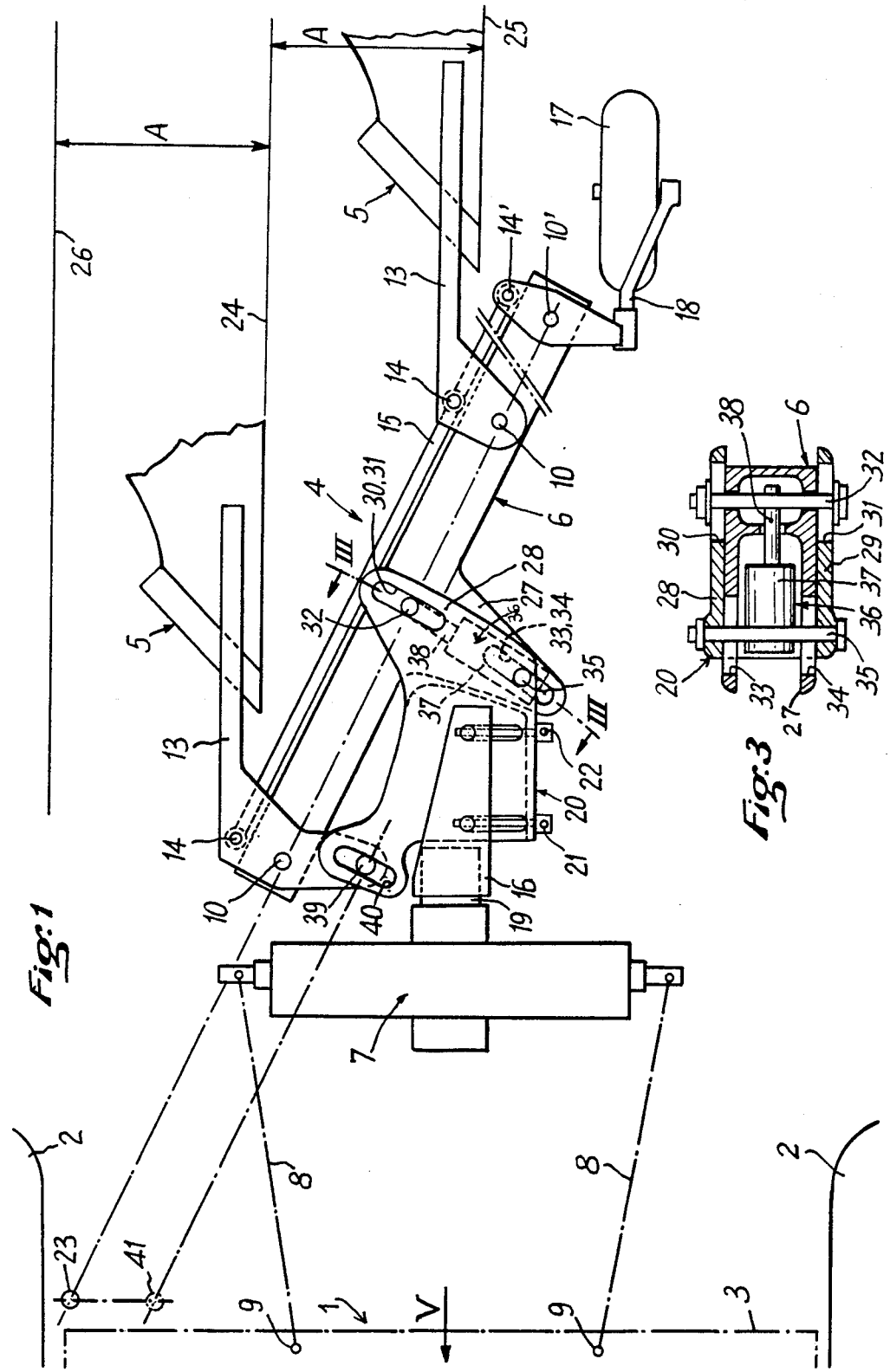
FIG. 1 is a plan view showing a plow according to the invention, in one adjustment position.

In FIG. 1 is shown a tractor 1 represented by its rear wheels 2 and, in chain-dot lines, its frame 3. V represents the forward direction of travel of the tractor 1.

Said tractor 1 pulls a gang plow 4 which includes a plurality of plow bottoms 5, a plow beam 6 for supporting the bottoms and a forecarriage unit 7 for coupling the plow beam 6 to the link-arms 8 of a conventional three-point hitch system. It should be noted that only the lower link arms are illustrated and it should be understood that the three point hitch also includes an upper link arm.

Said lower link arms 8 are substantially horizontal, converge in the forward direction and are each pivoted about vertical axis 9 on the tractor frame 3.

The plow bottoms 5 are each rigidly fixed to a plow bottom support bracket 13 which is pivoted at 10 on the plow beam and at 14 to a coupling member 15 in the form of a bar or connecting rod which extends parallel to the plow beam 6. As is well known, the plow bottoms 5 are maintained parallel to each other and are capable of controlled pivotal displacement with respect to the plow beam 6 about vertical pivot pins 10 which are uniformly spaced along the plow beam. The pivot pins 14 are also spaced at uniform intervals along coupling member 15 and defining deformable parallelograms with the pivot pins 10. The result being the plow bottoms 5 remain parallel to each other when the support brackets are pivoted about pivot 10.

By way of example, there is illustrated only two plow bottoms 5, but should be understood that the plow system can comprise more than two such bottoms, regularly spaced along the beam.

At the rear, the beam 6 is supported on the ground by a wheel 17, called a gauge wheel, the support 18 of which is pivoted at 10' on beam 6 and at 14' on the coupling member 15. The pivot pins 10', 14' are respectively in alignment with the pivot pins 10, 14 and they define with each of the pivot pin pairs 10, 14 a deformable parallelogram, so that the wheel 17 remains parallel to the plow bottoms 5.

The extension 16, in the case of a rollover plow, is connected to the forecarriage 7 through a pin 19 which, under the control of means (not shown), permits extension 16 to be rotated along with all it supports over 180° about a longitudinal axis. Such rollover devices are commonly known and are not part of this invention. Reference may be made to U.S. Pat. No. 3,554,294, which by reference is hereby made a part of this application for a detailed description of the roll over mechanism.

The extension 16 carries an intermediate support 20, which also in known manner, is adjustable transversely by means of two screws 21, 22. This adjustment allows the beam 6 along with the plow bottoms 5 to be displaced transversely to bring it in the appropriate position. This adjustment is provided to properly locate gang plow 4 relative to the tractor and is not involved in the adjustment process of the working width which is described hereafter.

The intermediate support 20 carries in turn the beam 6 which can pivot relative to support 20 about a vertical axis 23, fixed relative to said intermediate support 20.

The position of the axis 23 is established such that during the rotation of beam 6 relative to support 20, about axis 23, a variation dA of the cutting width A is accompanied by a transverse displacement dA of the line of action 24 of the first plow bottom 5, a transverse displacement 2dA of the line of action 25 of the second plow bottom 5, etc., and a displacement ndA of the line of action of the $n^{th}$ plow bottom.

As fully discussed in the above referred to U.S. patent application, Ser. No. 290,903, it is necessary, with respect to the previously formed furrows 26 that each plow bottom 5 moves transversely over an appropriate distance so that the new furrow width A+dA is respected between the previously formed furrow 26 and the furrow to be formed by the first plow bottom 5.

Due to the nature of the mounting of the supports 13 of the plow bottoms 5 on beam 6, it is sufficient that one of the plow bottoms is in the correct transverse position so that the others are also in said correct position.

According to the preferred embodiment of the invention, axis 23 is in alignment with the pivot pins 10 of the supports 13 on beam 6 and forward of the first pivot pin 10 by a distance which is equal to the distance separating two successive pivot pins 10.

Since axis 23 is well in front of the beam 6 and of the forecarriage, it is not materialized by a spindle pivot pin but defined by the mounting of the beam 6 on the intermediate support 20 via a system of slots visible in FIGS. 1 and 3.

The support 20 is, at the rear, in the shape of a fork in which fit the beam 6 and the side extension 27 of said beam. The two wings 28, 29 (see FIG. 3) of the fork are each formed with a curved slot 30, 31 receiving a vertical spindle 32 attached to the beam 6. In a similar way, the beam extension 27, which is box shaped, is formed with curved slots 33, 34 receiving a vertical spindle attached to support 20. The spindles 32, 35 have sufficient clearance relative to the slots so that they can slide.

The slots 30, 31, 33, 34 are centered on axis 23, so that beam 6, when rotating relative to support 20, and therefore relative to the forecarriage 7 and to the tractor frame 3, pivots about axis 23.

Figure 2:
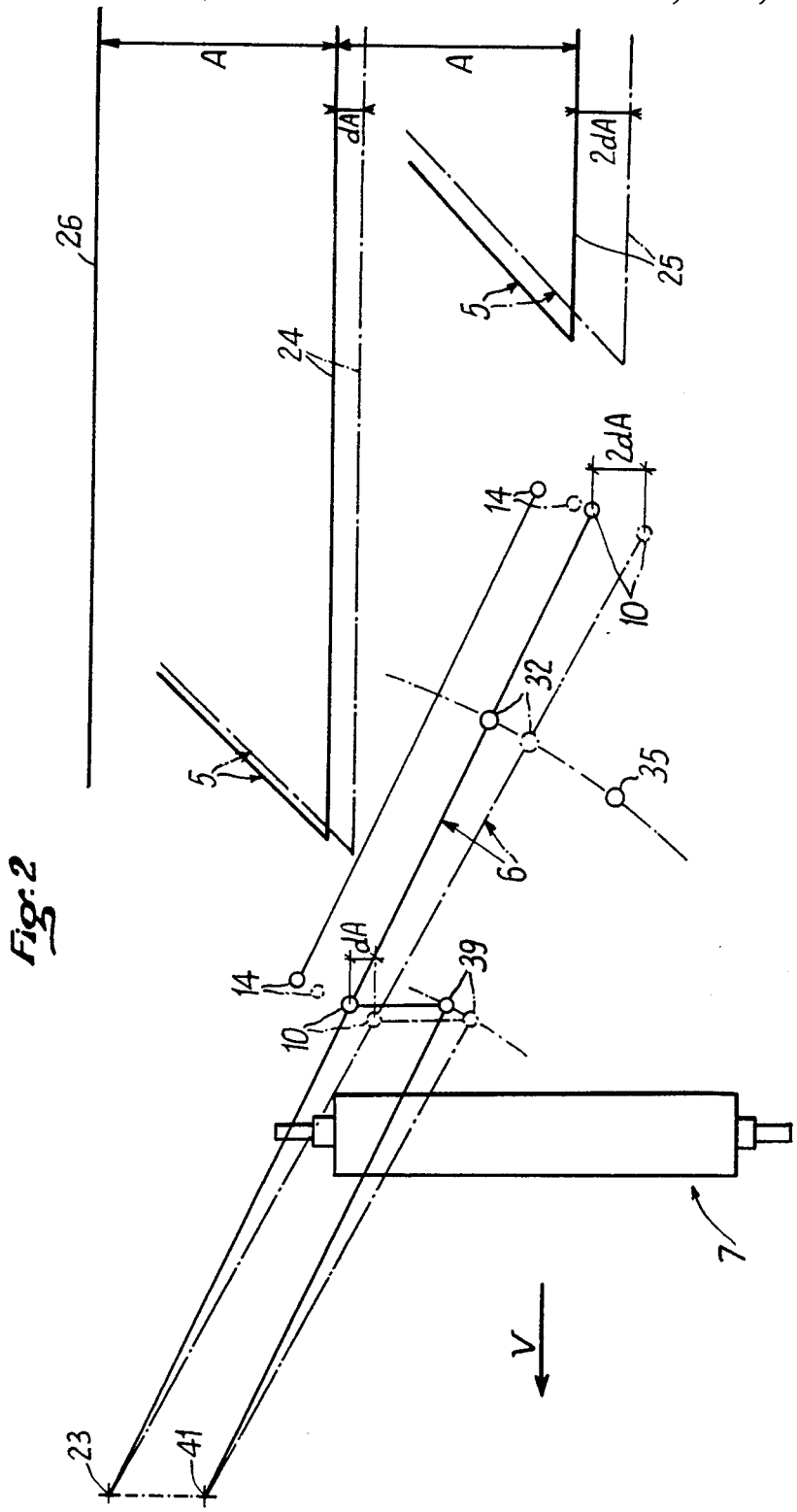
FIG. 2 is a schematic view of the plow of FIG. 1, for two adjustment positions.

Referring to FIG. 2 wherein the forecarriage 7 and axis 23 are shown in a fixed position whereas the pivot pins 10, 14 and the plow bottoms 5 are shown in two adjustment positions, it can be seen that due to the particular choice defined for the position of axis 23, a given rotation of beam 6 causes a variation dA of the cutting width A and at the same time a transverse displacement dA, to the left as viewed from the rear of the first plow bottom 5, the other plow bottoms 5 setting themselves automatically in the correct transverse position.

With this particular choice for the position of axis 23, there is obtained an absolute equality of the cutting width variation and of the transverse displacement of the first plow bottom, whatever said variation.

However, the invention should not be limited to locating axis 23 precisely as described above but should be interpreted to cover other possible alternatives, which provide an absolute or approximate equal result. Thus, and as an example, the location of axis 23 could be defined as being forward of pivot pin 10 of the first bottom support 13 along a line parallel to the direction of travel V, when the plow beam is in its medium adjustment position, the distance between axis 23 and said pivot pin 10 being defined as a function for example of the spacing between the pivot pins 10 on the beam and of the angle formed by plow beam 6 in its medium position with the direction of travel V.

In order to rotate beam 6 relative to support 20, actuating means are used which act between support 20 and the beam or one of the plow bottom supports 13.

In the embodiment illustrated, there is used a double acting hydraulic cylinder 36 the cylinder portion 37 of which is pivoted on the spindle 35 and the rod portion 38 of which is pivoted on spindle 32.

This hydraulic cylinder is actuated by the tractor cab control means, not shown and which are not part of the present invention, and allow the operator to control its extension or its retraction in order to obtain the required cutting width.

Hitherto, it has been assumed that the plow bottoms 5, while remaining parallel to each other due to their being mounted as deformable parallelograms, have lines of action 24, 25 that are parallel to the direction of travel V.

Theoretically this can be accomplished by designing the plow system such that the center of resistance exerted by the soil on the respective plow bottoms 5 are in the direction of travel V and in alignment with the pivot pins 10. Realistically this is accomplished in accordance with this invention, by causing one of the supports 13, through forced guiding, to always remain parallel to the direction of travel V.

As is shown in FIGS. 1 and 2, the support 13 of the first plow bottom 5 carries a vertical spindle 39 which moves within a curved slot 40 formed in support 20. Slot 40 is centered on a second fixed vertical axis 41 defining, with axis 23, the axis of spindle 39 and the axis of pivot pin 10 of the first plow bottom support 13, a deformable parallelogram. As side 23, 41 of said parallelogram is fixed, the opposite side 10, 39 can move, however, it will always be parallel to fixed side 23, 41, thereby ensuring that the first plow bottom 5, and therefore all the others, have lines of action that are parallel to the direction of travel V.

This forced guiding of the plow bottoms into parallel alignment with the direction of travel V insures that the bottoms will remain parallel without regard to the soil resistance factor, particularly when the plow is rolled over. This system is considered superior to a system that relies upon soil resistance because if the soil is not consistent the resistance on different plow bottoms will be different and they will assume non-parallel positions.

What is claimed is:

1. A gang plow of the type having a plurality of plow bottom support brackets each rigidly fixed to one plow bottom and uniformly mounted along a plow beam about vertical axes, a coupling member pivotally attached to the plow bottom support brackets and defining with the plow beam deformable parallelograms, and a forecarriage unit adapted to be carried by the link arms of a tractor hitch wherein the improvement comprises said plow beam being movable relative to said forecarriage unit such that it pivots about a first vertical axis fixed relative to said forecarriage unit, control means connected to said plow beam and said forecarriage unit for pivoting said plow beam about said first vertical axis to thus vary the angle formed by said plow beam and the direction of forward travel of the tractor, the position of said first fixed vertical axis being located forward of the articulation of the first support bracket along a line parallel to the direction of forward travel whereby pivoting of said plow beam about said first fixed axis causes a variation of the cutting width between the plow bottoms of a certain value and at the same time a transverse displacement of said certain value of the first plow bottom in the appropriate direction.

2. A plow according to claim 1, wherein the plow beam and the forecarriage are pivotally interconnected via a system of curved slots and spindles, the curved slots being centered on said first fixed vertical axis.

3. A plow according to claim 2, wherein the system of slots and spindles includes a curved slot provided on the forecarriage for cooperation with a vertical spindle mounted on said plow beam, and a curved slot provided on said plow beam for cooperation with a vertical spindle mounted on said forecarriage.

4. A plow according to claim 1, wherein the forecarriage includes an extension and an intermediate support, said intermediate support being adjustable in the transverse direction relative to said extension.

5. A gang plow of the type having a plurality of plow bottom support brackets each rigidly fixed to one plow bottom and uniformly mounted along a plow beam about vertical axes, a coupling member pivotally attached to the plow bottom support brackets and defining with the plow beam deformable parallelograms, and a forecarriage unit adapted to be carried by the link arms of a tractor hitch wherein the improvement comprises said plow beam being movable relative to said forecarriage unit such that it pivots about a first vertical axis fixed relative to said forecarriage unit, control means connected to said plow beam and said forecarriage unit for pivoting said plow beam about said plow vertical axis to thus vary the angle formed by said plow beam and the direction of forward travel of the tractor, the position of said first fixed vertical axis being located forward of the first plow bottom along a straight line extending through the articulations of the support brackets on said plow beam and at a distance from the articulation of the first support bracket equal to the distance between the articulations of two successive plow bottom support brackets on said plow beam whereby pivoting of said plow beam about said first fixed axis causes a variation of the cutting width between the plow bottoms of a certain value and at the same time a transverse displacement of said certain value of the first plow bottom in the appropriate direction.

6. A plow according to claim 5, wherein the plow beam and the forecarriage are pivotally interconnected via a system of curved slots and spindles, the curved slots being centered on said first fixed vertical axis.

7. A plow according to claim 6, wherein the system of slots and spindles includes a curved slot provided on the forecarriage for cooperation with a vertical spindle mounted on said plow beam, and a curved slot provided on said plow beam for cooperation with a vertical spindle mounted on said forecarriage.

8. A gang plow of the type having a plurality of plow bottom support brackets each rigidly fixed to one plow bottom and uniformly mounted along a plow beam about vertical axes, a coupling member pivotally attached to the plow bottom support brackets, and a forecarriage unit adapted to be carried by the link arms of a tractor hitch wherein the improvement comprises plow beam being movable relative to said forecarriage unit such that it pivots about a first vertical axis fixed relative to said forecarriage unit, one of said support brackets includes a spindle that is coupled to the forecarriage such that said spindle pivots about a second vertical axis fixed relative to said forecarriage, whereby said first and second fixed axes, said spindle of said plow bottom support bracket and the articulation axis of said one of said support brackets form a deformable parallelogram contributing to maintaining the plow bottom lines of action parallel to the fixed direction of travel, control means connected to said beam and said forecarriage unit for pivoting said plow beam about said first vertical axis to thus vary the angle formed by said plow beam and the direction of forward travel of the tractor, the position of said first fixed vertical axis being located whereby pivoting of said plow beam about said first fixed axis causes a variation of the cutting width between the plow bottoms of a certain value and at the same time a transverse displacement of said certain value of the first plow bottom in the appropriate direction.

* * * * *